(12) United States Patent
Valer Fuentes

(10) Patent No.: US 9,107,398 B2
(45) Date of Patent: Aug. 18, 2015

(54) METAL ALLOYS COMPOSED PRINCIPALLY OF COPPER AND HORSESHOES MADE WITH SAID ALLOYS

(75) Inventor: Diego Alexander Valer Fuentes, Santiago (CL)

(73) Assignee: COMERCIALIZADORA KRAVIVA S.P.A., Santiago (CL)

( * ) Notice: Subject to any disclaimer, the term of this patent is extended or adjusted under 35 U.S.C. 154(b) by 86 days.

(21) Appl. No.: 13/704,390

(22) PCT Filed: Jun. 6, 2011

(86) PCT No.: PCT/CL2011/000033
§ 371 (c)(1),
(2), (4) Date: Jan. 2, 2013

(87) PCT Pub. No.: WO2011/156931
PCT Pub. Date: Dec. 22, 2011

(65) Prior Publication Data
US 2013/0105180 A1 May 2, 2013

(30) Foreign Application Priority Data
Jun. 18, 2010 (CL) .................................. 655-2010

(51) Int. Cl.
*A01L 1/02* (2006.01)
*A01L 1/00* (2006.01)
*C22C 9/04* (2006.01)

(52) U.S. Cl.
CPC ... *A01L 1/02* (2013.01); *A01L 1/00* (2013.01); *C22C 9/04* (2013.01)

(58) Field of Classification Search
CPC ............... A01L 1/00; A01L 1/02; A01L 1/04; A01L 3/00; A01L 3/02; A01L 3/04; A01L 3/06; A01L 5/00; C22C 9/00; C22C 9/04
USPC ............................................................. 168/4
IPC .................... A01L 1/00, 3/00, 3/02, 3/04, 1/02, A01L 1/04
See application file for complete search history.

(56) References Cited

U.S. PATENT DOCUMENTS 4,655,293 A * 4/1987 Criner et al. ...................... 168/4
6,059,043 A   5/2000 Saurini

FOREIGN PATENT DOCUMENTS

| EP | 853880 A2 | 7/1998 |
| EP | 1273671 A1 | 1/2003 |
| GB | 179261 A | 4/1922 |
| JP | 1055348 A | 3/1989 |
| JP | 2118041 A | 5/1990 |
| JP | 8067933 A | 3/1996 |

OTHER PUBLICATIONS

PCT Search Report dated Nov. 11, 2011 of Patent Application No. PCT/CL2011/000033 filed Jun. 6, 2011.

* cited by examiner

*Primary Examiner* — Kathleen Alker
(74) *Attorney, Agent, or Firm* — Maine Cernota & Rardin

(57) ABSTRACT

The present invention provides metal alloys that comprise at least copper, zinc and aluminum and, in addition, include manganese and iron, for the production of horseshoes that have bactericidal and fungicidal properties, impeding the proliferation of bacteria and fungi specific to equines and mitigating the effects of vibration on equine joints, absorbing impacts known as "absolute shock".

6 Claims, 1 Drawing Sheet

METAL ALLOYS COMPOSED PRINCIPALLY OF COPPER AND HORSESHOES MADE WITH SAID ALLOYS

FIELD OF APPLICATION

This invention is related to metal alloys for the fabrication of bars and rods with an alloy made mainly of copper to manufacture horseshoes.

DESCRIPTION OF PRIOR ART

The history of the horseshoe is lost in the origins of civilization. Years after the domestication of the horse, the man found out that the hoof would wear out depending on the kind of work performed by the animal and the terrain. During the Metal Age, primitive men started designing the first horseshoes, which increased the horses performance and avoided problems such as limping.

But it was only during the age of the Great Empires that the horseshoe became popular, since Egyptians, Greeks, Persians and subsequently Romans would use them in their military cavalries.

The best known horseshoes in the ancient world were the "hipposandals" used by the Egyptians, Greeks and Romans which were made of an iron plate with raised sides and three rings through which they were held by a rope or leather strap.

Mongols and Asians from the Plains used leather "socks" on their animals.

The Japanese invented what is known in Spain as 'mule shoes', which were nothing more than a woven esparto or straw 'basket' tied to the hoof.

After 400 A.D., the Germans and Celts started using nails to attach the horseshoes, and the Romans followed their lead. Since then, the nailed horseshoe has been the most common type throughout the world and it is still the most used today.

It is attached using 30 to 80 mm long nails (even though the standard is 50 mm) that, if correctly attached observing a strict hoof and horseshoe preparation process, should not cause any discomfort to the animal.

The materials used to make horseshoes has not been always the same throughout history. Historians tell us that in Greece and Rome the hipposandals (the predecessor of the horseshoe) used on their horses by emperors such as Nero and his wife Poppaea were made of gold and silver.

Since then, and up to our days, different types of materials have been sought and tested in the manufacture of horseshoes. At the end of last century there was a real revolution in this area with the appearance of new materials for the manufacture of horseshoes (plastic, alloys, etc.) and for treating various types of pathologies (silicones, polymers, reconstruction resins, etc.).

Despite all of that, iron is to this day the main material used in the manufacture of most horseshoes.

The soft iron used in the manufacture of horseshoe nails is rigid enough not to bend when entering the hoof wall and has the ductility needed to enable it to be twisted several times without breaking. It is not used in the manufacture of horseshoes because it is too soft.

Steel iron, based on its carbon content (between 0.2% and 1.7%) is qualified as semi-soft, semi-hard and hard. Horseshoeing steel contains between 0.2% and 0.5% of carbon. Today it still is the material most used in the manufacture of horseshoes because it is readily available in the market and for its more competitive price. It has adequate hardness for proper horseshoe wear and for proper impact absorption. However care must be taken not to cool it abruptly, since this excessively increases its hardness and its ability to slip on hard surfaces, decreasing the absorption of vibrations.

Despite the advantages that iron has for the manufacture of horseshoes, it also has some inconveniences, mainly it has a high weight and does not absorb high frequency vibrations well, particularly on hard surfaces. Such vibrations result in a lack of comfort for the horse and even lead to pathologies such as arthrosis (ringbones), navicular inflammation, joint capsulitis and synovitis of the tendon sheaths.

All equines have fungal and bacterial contamination on their hoofs. Therefore, if there is any neglect in the daily cleaning tasks which they must undergo, there is a risk that this natural contamination becomes a pathologic and disabling condition. The recovery may take several months with obvious implications for the sports, business, competition, etc. One of the therapies for such conditions that stands out is the use of copper salts (sulfate, naphthenate, etc.), that may be released by the use of copper horseshoes.

On the other hand, the use of iron horseshoes exposes hooves and the anatomical structures contained in them to multiple vibrations that—from the clinical standpoint—are described as low intensity traumas, which are repeated over time' (shock absolut). This is closely related to the first cause of disability in equines, in other words, conditions affecting the musculoskeletal system.

Aluminum is used in alloys along with other metals to improve its durability. It has the advantage of a lower weight and the ability to better absorp vibrations. It also has a better grip on hard surfaces. The first types of aluminum used in the manufacture of horseshoes had an inconvenient reaction with the ammonium components of the urine, leading to a decomposition of the skin. Therefore, they had to be used in combination with light insoles (made of leather or other materials) to separate the horseshoe from direct contact with the hoof surface. Aluminum without an alloy is too soft for this application. Therefore various types of alloys are used nowadays to increase its durability to practically the same as an iron horseshoe.

Plastic, rubber and other materials have the advantage of their lower weight and their high absorption and shock dampening, but their high adherence to certain hard surfaces leads to very high traction on the joints of the horse. This aspect has been solved by some manufactures with the insertion of plastics with different hardness on the same horseshoe therefore resulting in different grips, which somehow provides a certain glide.

There are horseshoes with metal cores (iron, aluminum) and an external coating made of rubber or polyurethane. All of them have a good grip on hard surfaces and good dampening ability.

It should be taken into consideration that a horse receiving for the first time this type of dampening horseshoe, one which has a better grip on compact soil (including aluminum horseshoes) must undergo an adaptation period during which the horse must learn that the foot will not glide. Therefore, a stronger wear will be observed on the first set which will decrease on the following sets. In certain cases it becomes even smaller than with traditional horseshoes (those without widia). This detail must be considered before dismissing the quality of a new type of material.

However, the main inconvenience from all these materials is their high cost, which limits their application to very specific cases.

Among the 'new materials', we must consider those used in the preparation of the insoles and pads. In order to judge the dampening power of a sole, a test may be performed by hitting it repeatedly on the anvil with a blacksmith hammer allowing the impact resistance and the dampening ability to be checked.

Traditionally, the most commonly used material for insoles was leather with various thicknesses. However, nowadays this material is practically not used anymore because over time and with the action of moisture it loses its thickness. Thereby losing its dampening ability resulting in the horseshoe becoming loose.

Nowadays there are insoles that have been studied specifically to decrease the wear, primarily of the hoof heels on the upper horseshoe surface. Perfectly designed to open and close at the back, they follow the movement of the heels.

There are a variety of silicones in the current market—from glass silicone which is not recommended because of its acidity and difficult application (long drying time) to two-component silicones that are applied with special guns. They have different hardness and elasticities. All of them have a short 'setting' period and a very high catalyzation temperature, which make them suitable for use with horses, who due to various pathologies—need the weight to be distributed on the whole hoof (or to certain areas of it), as well as high footstep dampening and comfort. This category includes the silicones used by dentists to make certain dental prosthetics, which may also be used to distribute the weight to certain parts of the hoof.

The global horseshoe market is made up fundamentally of iron, aluminum and recently with plastic materials. The latter has been displacing the use of aluminum in materials for high level competition sports. The market is divided into 98% for iron, 1% for aluminum and 1% for reinforced plastic.

Currently there are several horseshoe manufacturers, and MUSTAD® stands out among them. This is a Swedish brand with representation in *Argentina*, which is one of the few countries producing quality horseshoes both in steel and aluminum that are not only sold locally but that are also very competitive internationally.

From its plant in Tres Arroyos, in the province of Buenos Aires, Mustad® produces mainly aluminum horseshoes that are directly exported to 18 countries—the Mercosur countries (Argentina, Brazil, Paraguay, Uruguay, Venezuela), then Chile, Bolivia, Colombia, Peru, Mexico, Turkey and the USA—and from the US to the Netherlands, France, Spain, Italy and the Scandinavian countries.

It is known that copper and its alloys have bactericidal and fungicidal properties that can prevent the spread of the equines' own bacteria and fungi. There is also a decrease in low intensity trauma when this material is used. Therefore alloys with various copper percentages have been researched for the manufacture of horseshoes, starting with pure copper.

With this in mind, patent document U.S. Pat. No. 6,059,043 published on May 9, 2000 by the inventor Luciano Saurini and titled "Horseshoe" describes a horseshoe made of copper which releases copper sulfate when it comes in contact with moisture, a chemical that is particularly important in fungal prevention and treatment. The horseshoe enables the absorption of the vibrations to which the animal is subject. However, this 100% copper horseshoe does not have any strength, breaks when it is heated and causes damage to the feet of horses and other defects resulting from these circumstances. Therefore, it is essential to have a horseshoe based on a copper alloy that provides enough strength, is malleable for hot work and absorbs vibrations on the feet of equines efficiently.

DETAILED DESCRIPTION OF THE INVENTION

Figure 1:
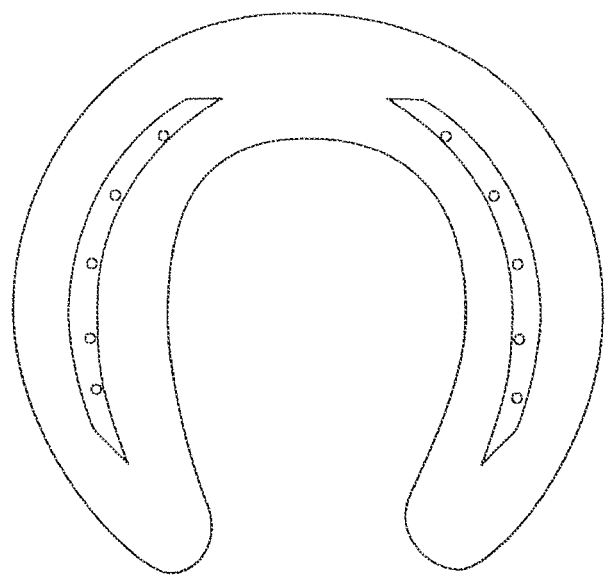
FIG. 1 shows a front view of a horseshoe with this invention's alloy.
Figure 2:
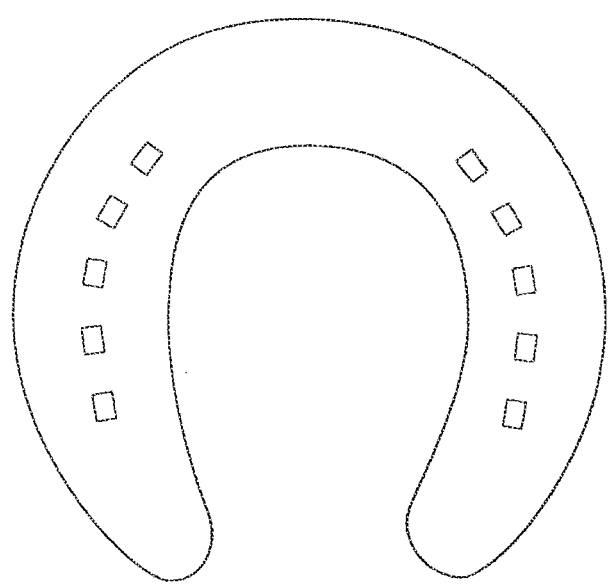
FIG. 2 shows a back view of a horseshoe with this invention's alloy.

This invention provides a product that considers metal alloys composed mainly of copper and other materials for the fabrication of bars and rods for use in the manufacture of horseshoes, where such alloys are moldable at a lower melting point than for iron, steel, bronze and pure copper; and which have excellent behavior and plasticity for hot stamping; which accept cold deformation well, and have good malleability and ductility; which they have good corrosion resistance; which they have bactericidal and fungicidal properties that prevent the spread of equines' own bacteria and fungi; and where by using copper, which has the characteristic of absorbing impacts known as "shock absolut", they can mitigate vibration effects on the joints of equines.

Preliminary study results have provided a favorable background regarding the use of copper alloy horseshoes for equines, since an issue that affects the equines is the spread of fungi which corrodes their hooves and, therefore, compromises their mobility and work life since they always stand on chips or straw dampened by their own organic emissions—whether stool or urine—which results in hoof decay as a result of microorganisms. When a copper alloy horseshoe is used, it reacts on its own and produces copper salts, which are very useful for treating the hoof decay caused by the action of microorganisms—whether bacteria or fungi—with which it is permanently in contact.

In view of the above and in order to validate the added value of this copper alloy, a study was carried out by the Institute of Nutrition and Food Technology (INTA) jointly with Procobre to analyze the antibacterial activity of copper horseshoes on infectious pathologies of horse hooves.

This study included two protocols, which are described below:

Protocol 1:
Isolating and characterizing the pathogenic flora.
Identifying and characterizing the non pathogenic flora.
Determining the susceptibility of pathogens and native microflora to copper sulfate in vitro.
Determining plamids in *fusobacterium* strains.
Protocol 2:
Comparing pathogenic and non pathogenic flora in animals shoed with and without the alloy.
Determining copper in the tissues and serum of animals shoed with and without the alloy.
Clinical follow-up of animals shoed with and without the alloy.

Bacteriological Study

Samples were obtained from the hooves of 20 horses shoed with iron (100%) and 20 horses shoed with copper (100%) and copper/zinc alloy (85%/15%). The 40 samples were cultured in specific media for aerobic and anaerobic microorganisms.

The microbiological results showed a significant lower microbial presence in the hooves of horses shoed with copper (either pure or in alloy) when compared to horses shoed with iron.

The hoof samples of 40 horses were reviewed, of which 20 corresponded to horses shoed with iron, 9 to horses shoed with an 85.15% copper alloy, and 11 to horses shoed with 100% copper.

The results showed that in general the hoof samples obtained from horses shoed with iron had high bacterial counts and a high frequency of polymicrobial cultures both of aerobic and anaerobic flora. This contrasted to the samples coming from horses shoed with copper, where the counts were low and only included a few bacterial species.

With regard to the potential pathogens specifically investigated, it was observed:

I. Anaerobic Microorganisms
*Fusobacterium necrophorum*: Not isolated in any of the samples.

*Clostridium*: The presence of species of the genus *Clostridium* was detected in only one experimental and one control sample respectively.

*Bacteroides*: Species of the genus *Bacteroides* were also detected in only one experimental and one control sample respectively.

With regard to anaerobic microorganisms, 24 strains still have to be confirmed.

II. Aerobic Microorganisms

*Streptococcus* β-hemolitico: This pathogen was not identified in any of the two groups.

*Staphylococcus aureus*: One case was isolated in the group of horses shoed with iron.

Enterobacteriaceas: Abundant presence of several bacterial species was shown in 100% (20/20) of the samples from horses shoed with iron, including *E. coli, Klebsiella, Enterobacter, Citrobacter* and *Proteus*. On the other hand, scarce enterobacterial growth was detected in only 15% (3/20) of the samples from horses shoed with copper.

*Bacillus*: High counts of species from the genus *Bacillus* were found on 75% (15/20) of the samples from horses shoed with iron, while they were isolated in only 45% (9/20) of the group of horses shoed with copper and with smaller counts.

Determination of Copper in the Tissues and Serum

The copper content analysis was performed on 20 samples (10 from horses shoed with copper and 10 from horses shoed with iron). The results are summarized below:

The serum samples did not show any differences in copper content. In other words, the horses shoed with copper and the horses shoed with iron had similar copper averages of 97.5 and 97 ug/dl respectively.

The analyses made on the surface hoof samples (corresponding to the second layer), showed significant differences in their copper contents. Thus, in average the horses shoed with copper (either pure or in alloy) showed a higher concentration of that metal in their hoof tissues (270.98 mg/100 g) than the ones shoed with iron (14.24 mg/100 g).

The determinations made in samples from the deep hoof (corresponding to the fourth layer, 1 cm below the surface sample) of horses shoed with copper showed a higher concentration of such metal (39 mg vs. 0.86 mg/100 g), even though there was a high level of variability between animals.

In view of the above, it was determined that the use of various alloys had the following characteristics:

| Material Symbol Percentage | Copper Cu % | Zinc Zn % | Aluminum Al % | Manganese Mn % | Iron Fe % | Days from Shoeing (*) | Comments |
|---|---|---|---|---|---|---|---|
| Type 1 | 100 | 0 | 0 | 0 | 0 | 0.5 | Very soft alloy; breaks easily. |
| Type 2 | 90 | 10 | 0 | 0 | 0 | 1 | Harder alloy; breaks or cracks with horse kicks. |
| Type 3 | 85 | 10 | 5 | 0 | 0 | 30 | Good behavior; but cracks were seen when replacing the horseshoe. |
| Type 4 | 85 | 15 | 0 | 0 | 0 | 30 | Good behavior; very hard; cracks still persist. |
| Type 5 | 83 | 15 | 2 | 0 | 0 | 120 | Good behavior; the cracks disappear. |
| Type 6 | 83 | 15 | 1 | 1 | 0 | 120 | Very good behavior; no cracks appear; no damage occurs; and they enable making tabs. |
| Type 7 | 83.5 | 15 | 1 | 0.25 | 0.25 | 120 | Very good behavior; good hardness; there are no cracks; it withstands rocky surfaces; very good termination. |

(*) A set of horseshoes is replaced every 30 to 45 days on average from the date of shoeing. The horseshoe replacement is not due to the product wear, but to uneven horse hoof growth.

III. Filamentous and Yeast-Like Fungi

The presence of filamentous fungi was demonstrated in similar rates (50%). However, significant differences were detected in the bacterial counts. In effect, the counts on horses shoed with iron were higher than those of horses shoed with copper, in fact only scarce colonies were observed in the latter ones. Yeast-like fungi were not detected in any of the samples from animals in both groups.

The identification of the native microflora is currently underway. The initial finding is the presence of a numerous and varied range of opportunistic bacteria in horses shoed with iron.

It has been determined from the chart above that the alloys that may be used for the manufacture of durable horseshoes would be the ones containing at least Copper (Cu), Zinc (Zn) and Aluminum (Al), with the respective tolerances listed in the table below:

| Component | Type 7 Alloy | Type 6 Alloy | Type 5 Alloy | Type 4 Alloy |
|---|---|---|---|---|
| Copper | 83.5% ± 5.0% | 83.0% ± 5.0% | 83.0% ± 5.0% | 83.0 ± 3.0% |
| Zinc | 15.0% ± 5.0% | 15.0% ± 3.0% | 15.0% ± 3.0% | 17.0 ± 15.0% |
| Aluminum | 1.0% ± 0.75% | 1.0% ± 0.75% | 2.0% ± 1.0% | |
| Manganese | 0.25% ± 0.20% | 1.0% ± 0.25% | | |
| Iron | 0.25% ± 0.20% | | | |

The Continuous Casting process is used to obtain copper alloy bars, in which the operators weight the various quantities of metals required for the alloy according to the composition determined in this invention. Once the raw materials have been dosed in the drums, they are taken to lifting platforms that will lift the dosed material to the corresponding melting furnace.

The material coming from the dosing area is poured into the melting furnaces of each line. Before pouring the metal from the melting furnace into the holding furnace, alloy samples are taken. These are analyzed at the chemistry laboratory using the Emission Spectrometry method and the Atomic Absorption Spectrometry method, which ensure compliance with the specifications with regard to the alloy chemical composition.

When the metal is molten and it has been confirmed that the alloy is within the established parameters, the melting furnace is tilted and the molten metal is poured into the holding furnace through transfer channels. The continuous casting of the material is produced from this furnace.

Solidification occurs at the refrigeration area, which comprises water cooled copper radiators and graphite nozzles or molds shaped as rolled wires or bars in the sizes and quantities of strands to be cast. An extractor removes the solidified rolled wires or bars, enabling the system to operate continuously. At the same time, it uses a spool to wind the rolled wire or bars or to cut them in 3 or 6 meter rods respectively, which enables easier handling and transportation.

Subsequently, the surface oxide is removed by submerging the rolled wire rolls or bars in tubs with acid solution and rinses, providing a product that is clean, shinny and oxide free.

This alloy enables the fabrication of 8×20, 8×22, 8×25, 10×20 and 10×25 bars and rods, which enable the manufacture of horseshoes which meet the following characteristics:
Release of copper salts.)
A hardness that prevents its fragmentation and breakage.
The invention claimed is:

1. A copper alloy horseshoe consisting of 78.5% to 88.5% of copper, from 10% to 20% of zinc, from 0.25% to 1.75% of aluminum, from 0.05% to 0.45% of manganese, and from 0.05% to 0.45% of iron, for the manufacture of a moldable horseshoe at a lower melting point than iron, steel, bronze and pure copper, with bactericidal and fungicidal properties that prevent the spread of bacteria and fungi, and mitigating the effects of vibration on joints of equines.

2. The copper alloy horseshoe described in claim 1, CHARACTERIZED in that its copper content is 83.5%.

3. The copper alloy horseshoe described in claim 1, CHARACTERIZED in that its zinc content is 15%.

4. The copper alloy horseshoe described in claim 1, CHARACTERIZED in that its aluminum content is 1%.

5. The copper alloy horseshoe described in claim 1, CHARACTERIZED in that its manganese content is 0.25%.

6. The copper alloy horseshoe described in claim 1, CHARACTERIZED in that its iron content is 0.25%.

* * * * *